US008723813B2

(12) United States Patent
Park et al.

(10) Patent No.: US 8,723,813 B2
(45) Date of Patent: May 13, 2014

(54) FLAT PANEL DISPLAY DEVICE

(75) Inventors: Sung-Un Park, Suwon-si (KR); Tae-Jin Kim, Suwon-si (KR); Joo-Hyeon Jeong, Suwon-si (KR); Soon-Sung Ahn, Suwon-si (KR); In-Ho Choi, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 839 days.

(21) Appl. No.: 12/494,502

(22) Filed: Jun. 30, 2009

(65) Prior Publication Data

US 2010/0020041 A1 Jan. 28, 2010

(30) Foreign Application Priority Data

Jul. 23, 2008 (KR) ........................ 10-2008-0071908

(51) Int. Cl.
*G06F 3/044* (2006.01)
(52) U.S. Cl.
USPC ...................... 345/173; 178/18.06; 178/18.01
(58) Field of Classification Search
CPC ............................... G06F 3/0412; G06F 3/044
USPC .......... 345/173–184; 178/18.05, 18.01–20.01
See application file for complete search history.

(56) References Cited

U.S. PATENT DOCUMENTS

| 5,369,228 | A | * | 11/1994 | Faust | 178/18.05 |
|---|---|---|---|---|---|
| 6,002,389 | A | * | 12/1999 | Kasser | 345/173 |
| 6,657,614 | B1 | * | 12/2003 | Ito et al. | 345/168 |
| 7,154,481 | B2 | * | 12/2006 | Cross et al. | 345/173 |
| 7,538,760 | B2 | * | 5/2009 | Hotelling et al. | 345/173 |
| 8,089,470 | B1 | * | 1/2012 | Schediwy et al. | 345/173 |
| 8,384,675 | B2 | * | 2/2013 | Westerman et al. | 345/173 |
| 2006/0197753 | A1 | * | 9/2006 | Hotelling | 345/173 |
| 2007/0291010 | A1 | * | 12/2007 | Altonen et al. | 345/173 |
| 2008/0316182 | A1 | * | 12/2008 | Antila et al. | 345/173 |
| 2009/0160790 | A1 | * | 6/2009 | Fukushima et al. | 345/173 |

FOREIGN PATENT DOCUMENTS

| JP | 2006-302251 | 11/2006 |
|---|---|---|
| JP | 2007-305110 | 11/2007 |
| KR | 10-2005-0019799 | 3/2005 |
| KR | 10-2007-0102414 | 10/2007 |

OTHER PUBLICATIONS

Korean Office Action dated Jan. 28, 2010, issued in corresponding Korean Patent Application No. 10-2008-0071908.

* cited by examiner

*Primary Examiner* — Amare Mengistu
*Assistant Examiner* — Vinh Lam
(74) *Attorney, Agent, or Firm* — Christie, Parker & Hale, LLP (57) ABSTRACT

A flat panel display device that can easily determine whether it has been touched or not by sensing a variation in capacitance by using a cushion member. The flat panel display device includes a first face; a frame having a conductive face and supporting the first face and having a conductive face; a cushion member interposed between the first face and the conductive face and formed of a dielectric material, wherein a thickness of the cushion member varies depending on an externally applied pressure, a conductive film interposed between the first face and the cushion member; and a sensor unit electrically connected to the conductive face and the conductive film respectively, which calculates and senses a variation in capacitance of a capacitor comprising the conductive face, the cushion member, and the conductive film.

13 Claims, 5 Drawing Sheets

FLAT PANEL DISPLAY DEVICE

CROSS-REFERENCE TO RELATED APPLICATION

This application claims the benefit of Korean Patent Application No. 10-2008-0071908, filed Jul. 23, 2008, in the Korean Intellectual Property Office, the disclosure of which is incorporated herein by reference.

BACKGROUND OF THE INVENTION

1. Field of the Invention

Aspects of the present invention relate to a flat panel display device, and more particularly, to a flat panel display device capable of sensing touch by detecting an applied pressure.

2. Description of the Related Art

Recently, display devices have been replaced by portable thin flat panel display devices. Flat panel display devices widely use touch functions to input signals into the flat panel display devices. As an example of the touch functions, the flat panel display devices sense a variation in capacitance according to a user's touch.

However, in terms of a conventional flat panel display device sensing a variation in capacitance, a pattern of capacitance is formed inside the flat panel display device and the pattern is sensed so as to determine a user's touch and the location of the touch. Thus, circuitry inside the flat panel display device becomes complicated. Also, when the location of the touch is determined according to a variation in capacitance, the capacitance often varies before the device is touched, thereby causing errors in determining the location of the touch.

SUMMARY OF THE INVENTION

Aspects of the present invention provide a flat panel display device that can easily determine whether it has been touched or not by sensing a variation in capacitance by the use of a cushion member.

According to an aspect of the present invention, there is provided a flat panel display device comprising: a flat panel display device having a first face and a second face which are opposite to each other; a frame having a conductive face and supporting the first face; a cushion member interposed between the first face and the conductive face and formed of a dielectric material, wherein a thickness of the cushion member varies depending on an externally applied pressure, a conductive film interposed between the first face and the cushion member; and a sensor unit electrically connected to the conductive face and the conductive film respectively, which calculates and senses a variation in capacitance of a capacitor comprising the conductive face, the cushion member, and the conductive film.

The conductive face may be formed of a metal, and the conductive face and the frame may be integrally formed.

The frame may be formed of an insulator.

The conductive film may be patterned. Here, the cushion member may be patterned and may be patterned in the same pattern as the conductive film.

The flat panel display device may display an image through the second face.

The cushion member may further include an adhesive layer.

According to another aspect of the present invention, there is provided a flat panel display device including: a pair of conductive faces which are opposite to each other; a cushion member interposed between the conductive faces and formed of a dielectric material, wherein a thickness of the cushion member varies depending on an externally applied pressure; a flat panel display device located on an outer side of one conductive face of the conductive faces; and a sensor unit electrically connected to each of the conductive faces, which calculates and senses a variation in capacitance of a capacitor comprising the conductive faces and the cushion member.

One of the conductive faces may be patterned. Here, the same pattern is used to pattern the cushion member and the conductive face.

The cushion member may further include an adhesive layer.

According to an aspect of the present invention, the sensor unit measures a variation in capacitance corresponding to changes in thickness of a cushion member, and thus when the variation becomes more than a standard value, the sensor unit can determine whether a user touched a display panel or not. Thus, determination of the touch can be more accurate. As such, according to an aspect of the present invention, a touch error which is a problem of touch functions using only a variation in capacitance when a user's finger touches an OLED display panel or using only a photosensor, that is, an error in which it is perceived that a user has touched the OLED display panel even though the user only approached the OLED display panel without touching it, can be overcome.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

As referred to herein, when a first element is said to be disposed or formed "on", or "adjacent to", a second element, the first element can directly contact the second element, or can be separated from the second element by one or more other elements located therebetween. In contrast, when an element is referred to as being disposed or formed "directly on" another element, there are no intervening elements present. As used herein, the term "and/or" includes any and all combinations of one or more of the associated listed items.

Figure 1:
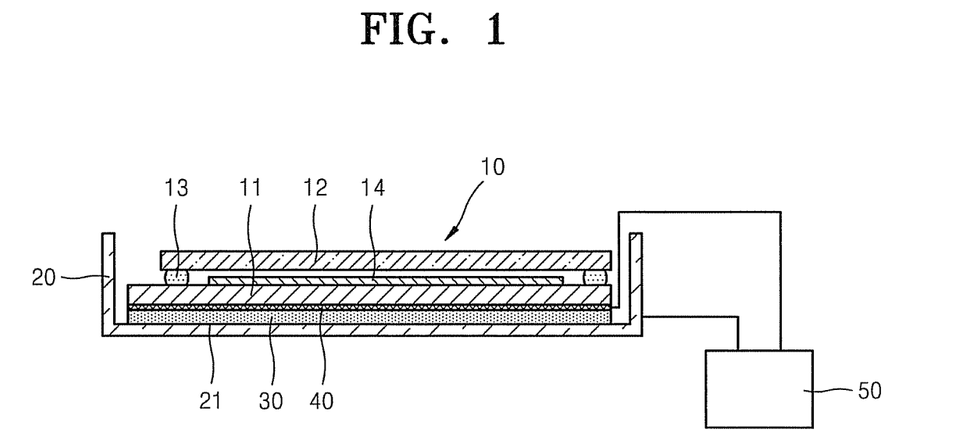
FIG. 1 is a cross-sectional view of a flat panel display device according to an embodiment of the present invention.

FIG. 1 is a cross-sectional view of a flat panel display device according to an embodiment of the present invention.

Referring to FIG. 1, the flat panel display device includes an organic light emitting display panel 10 and a frame 20 supporting the organic light emitting display panel 10. A cushion member 30 is disposed between the organic light emitting display panel 10 and the frame 20, and a conductive film 40 is disposed between the cushion member 30 and the organic light emitting display panel 10. The frame 20 and the conductive film 40 are electrically connected to each other through the sensor unit 50.

The organic light emitting display panel 10 includes a first substrate 11 and a second substrate 12 which are opposite to each other, and the first substrate 11 and the second substrate 12 are sealed together at their end portions by a sealing material 13. A light emitting unit 14 is interposed between the first substrate 11 and the second substrate 12 which are sealed together.

Figure 2:
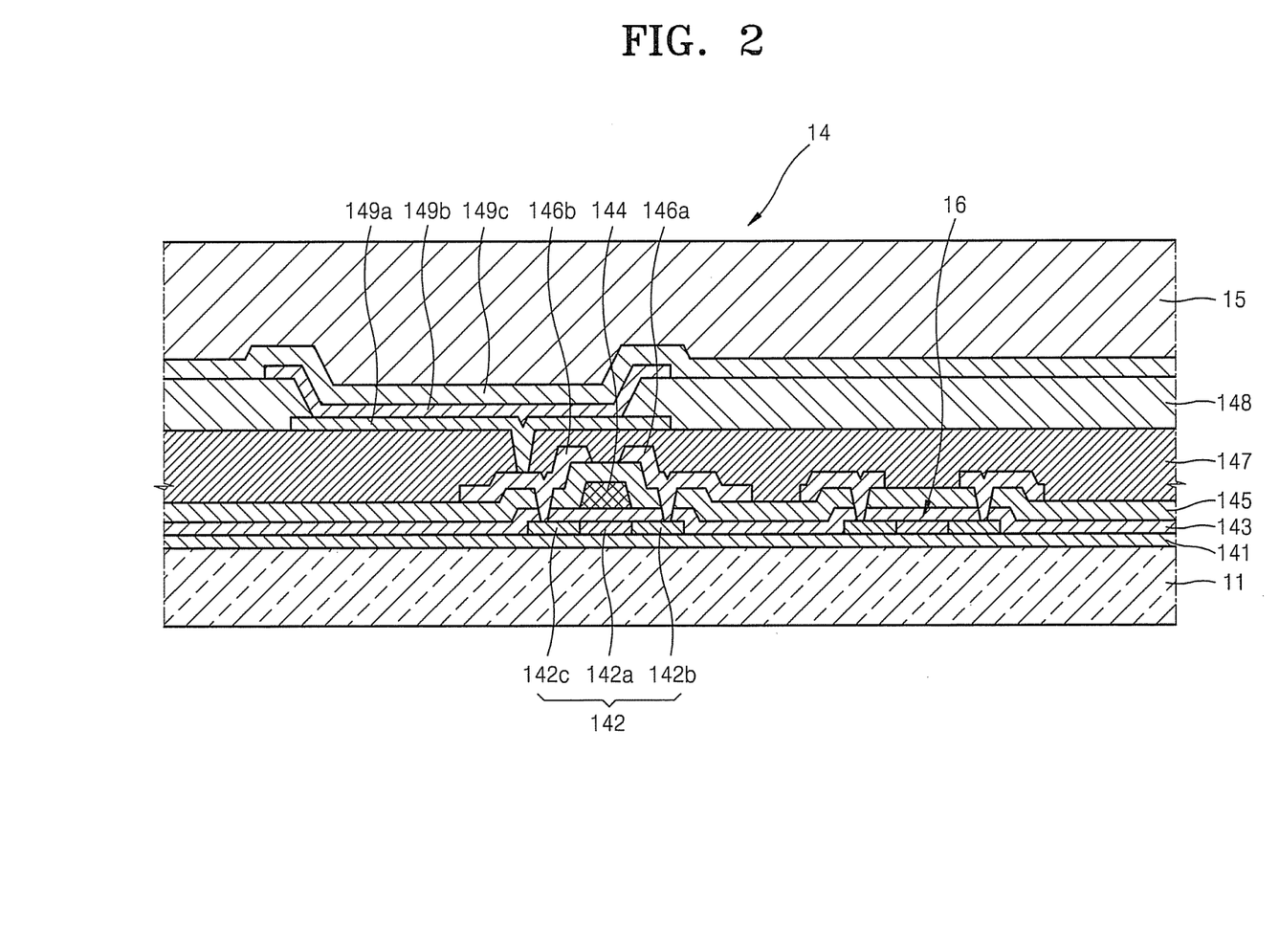
FIG. 2 is a cross-sectional view of an exemplary embodiment of a pixel in a light emitting unit of FIG. 1.

FIG. 2 is a cross-sectional view of an example of a pixel in the light emitting unit 14 of FIG. 1.

Referring to FIG. 2, an insulating layer 141, such as a barrier layer and/or a buffer layer, which prevents diffusion of impurity ions and permeation of moisture or external air and planarizes the surface of the first substrate 11, may be formed on an upper surface of the first substrate 11.

An active layer 142 for a thin film transistor (TFT) is formed of a semiconductor material on the insulating layer 141, and a gate insulating layer 143 is formed so as to cover the active layer 142. The active layer 142 may be formed of an inorganic semiconductor material, such as amorphous silicon or polysilicon, or an organic semiconductor material. The active layer 12 has a source region 142b, a drain region 142c, and a channel region 142a between the source region 142b and the drain region 142c.

A gate electrode 144 is formed on the gate insulating layer 143, and an interlayer insulating layer 145 is formed so as to cover the gate electrode 144. A source electrode 146a and a drain electrode 146b are formed on the interlayer insulating layer 145. A planarization layer 147 and a pixel-defining layer 148 are sequentially formed so as to cover the source electrode 146a and the drain electrode 146b.

The gate insulating layer 143, the interlayer insulating layer 145, the planarization layer 147, and the pixel-defining layer 148 may be formed of an insulating material in a single- or multi-layered structure, and may be formed of an organic material, an inorganic material, or an organic/inorganic composite material.

Such a stacked structure of the TFT as described above is not limited thereto, and the TFT may have various other structures.

A pixel electrode 149a of an organic light emitting diode (OLED) is formed on the planarization layer 147, and a pixel-defining layer 148 is formed on the planarization layer 147. A predetermined opening is formed in the pixel-defining layer 148 so as to expose the pixel electrode 149a, and an organic emitting layer 149b of the OLED is formed.

The OLED displays predetermined image information by emitting red, green, and blue light according to the flow of a current. The OLED includes the pixel electrode 149a, which contacts the drain electrode 146b of the TFT via a contact hole, an opposing electrode 149c covering all of the pixels, and the organic emitting layer 149b disposed between the pixel electrode 149a and the opposing electrode 149c so as to emit light.

The pixel electrode 149a and the opposing electrode 149c are insulated from each other by the organic emitting layer 149b, and voltages having different polarities are applied to the organic emitting layer 149b so as to emit light from the organic emitting layer 149b.

The organic emitting layer 149b may be formed of a low-molecular weight organic layer or a polymer organic layer. A hole injection layer (HIL), a hole transport layer (HTL), an emitting layer (EML), a hole transport layer (HTL), an emitting layer (EML), an electron transport layer (ETL), an electron injection layer (ETL), etc., may be formed in a single-layered structure of a stacked composite structure. Examples of organic materials that can be used include copper phthalocyanine (CuPc), N,N'-di(naphthalene-1-yl)-N,N'-diphenyl-benzidine (NPB), tris-8-hydroxyquinoline aluminum (Alq3), etc. Such organic layers may be formed using vacuum deposition. In this case, the HIL, the HTL, the ETL, the EIL, etc., may be common to red, green, and blue pixels. Accordingly, unlike the structure in FIG. 2, these common layers may be formed so as to cover the entire pixels, like the opposing electrode 149c.

The pixel electrode 149a functions as an anode, and the opposing electrode 149c functions as a cathode. Alternatively, the polarities of the pixel electrode 149a and the opposing electrode 149c may be reversed.

In a bottom emission type display, in which an image is displayed toward the first substrate 11, the pixel electrode 149a may be a transparent electrode, and the opposing electrode 149c may be a reflective electrode. In this case, the pixel electrode 149a may be formed of a high work function material, for example, ITO, IZO, ZnO, $In_2O_3$, etc. The opposing electrode 149c may be formed of a low work function metal, for example, Ag, Mg, Al, Pt, Pd, Au, Ni, Nd, Ir, Cr, Li, Ca, etc.

In a top emission type display, in which an image is displayed toward the opposing electrode 149c, the pixel electrode 149a may be formed as a reflective electrode, and the opposing electrode 149c may be formed as a transparent electrode. The reflective electrode for the pixel electrode 149a may include a reflective layer formed of Ag, Mg, Al, Pt, Pd, Au, Ni, Nd, Ir, Cr, Li, Ca, a combination thereof, etc., or a high work function material, for example, ITO, IZO, ZnO, $In_2O_3$, etc. In addition, the transparent electrode for the opposing electrode 149c may be formed by depositing a low work function metal, for example, Ag, Mg, Al, Pt, Pd, Au, Ni, Nd, Ir, Cr, Li, Ca, or a combination thereof and forming an auxiliary electrode layer or a bus electrode line thereon by using a transparent conductive material, such as ITO, IZO, ZnO, $In_2O_3$, etc.

In a double-side emission type display, both the pixel electrode 149a and the opposing electrode 149c may be formed as transparent electrodes.

FIG. 1 illustrates a structure in which the first substrate 11 is seated in the frame 20, and thus, the structure may be a top emission type display in which an image is displayed toward the second substrate 12. Although not shown in the drawings, when the flat panel display device has a structure in which a predetermined opening is formed in the frame 20, and a bottom surface of the first substrate 11 is exposed through the opening, a bottom emission type display or a double-side emission type display may be applied to the flat panel display device.

Materials for forming the pixel electrode 149a and the opposing electrode 149c are not limited to those described above. For example, the pixel electrode 149a and the opposing electrode 149c may be formed of a conductive organic material, or a conductive paste containing conductive particles, for example, Ag, Mg, Cu, etc. When using such a conductive paste, the pixel electrode 149a and the opposing electrode 149c may be formed by inkjet printing. After the inkjet printing, baking is performed to obtain the electrodes.

A passivation layer 15 may be further formed on the opposing electrode 149c in the light emitting unit 14 so as to cover the light emitting unit 14. The passivation layer 15 may be formed of an inorganic material, an organic material, or organic and inorganic materials stacked upon one another.

As illustrated in FIG. 2, a photosensor 16 may be formed in the light emitting unit 14. The photosensor 16 may be formed by disposing a photodiode over each pixel or pixels adjacent to one another to sense the location of a user's touch. According to an aspect of the present invention, a well-known method for the sensing of the location of the touch by using the photosensor 16 may be performed.

The conductive film 40 is formed under the first substrate 11 in the organic light emitting display panel 10 as illustrated in FIG. 1, and may be formed by sputtering, deposition, or the like. However, aspects of the present invention are not limited thereto. The conductive film 40 may be adhered to the first substrate 11 by using an adhesive agent.

The conductive film 40 may be uniformly formed over the entire bottom surface of the first substrate 11, to improve the ability of the sensor unit 50 to sense whether the organic light emitting display panel 10 is touched or not.

The frame 20 supporting the organic light emitting display panel 10 may be formed of a conductive metal. The frame 20 may have a predetermined hardness so as to protect the organic light emitting display panel 10 from an external impact.

A conductive face 21 is formed in a portion of the frame 20 facing the organic light emitting display panel 10. The conductive face 21 is formed integrally with the frame 20 which is formed of a conductive metal.

The cushion member 30 is formed between the conductive film 40 and the frame 20.

The cushion member 30 is formed of a dielectric material and may be formed of a material having a thickness that varies according to an external pressure, for example, silicon.

The cushion member 30 described above may be formed in a region where the conductive film 40 is formed, due to the fact that the conductive face 21 of the frame 20 and the conductive film 40 together constitute a capacitor.

Figure 3:
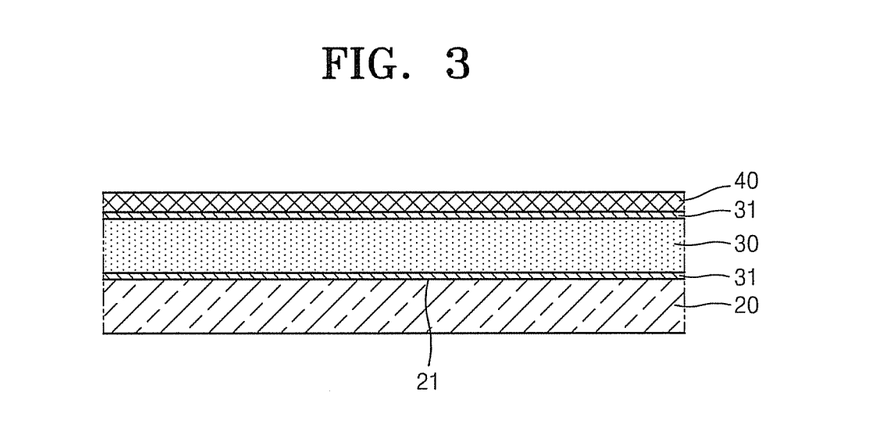
FIG. 3 is a cross-sectional view of another exemplary embodiment of a cushion member of FIG. 1.

As illustrated in FIG. 3, the cushion member 30 may include adhesive layers 31 formed in both upper and lower surfaces thereof. The frame 20 and the conductive film 40 may respectively adhere to upper and lower surfaces of the cushion member 30 through the adhesive layers 31. Here, the adhesive layers 31 may be formed of a dielectric material.

In the above structure, the conductive film 40, the cushion member 30, and the conductive face 21 of the frame 20 constitute one capacitor.

Aspects of the present invention include a sensor unit 50 electrically connected to the capacitor. The sensor unit 50, which is electrically connected to both the conductive film 40 and the conductive face 21 of the frame 20, calculates and senses a variation in capacitance of the capacitor comprising the conductive film 40, the cushion member 30, and the conductive face 21 of the frame 20.

Figure 4:
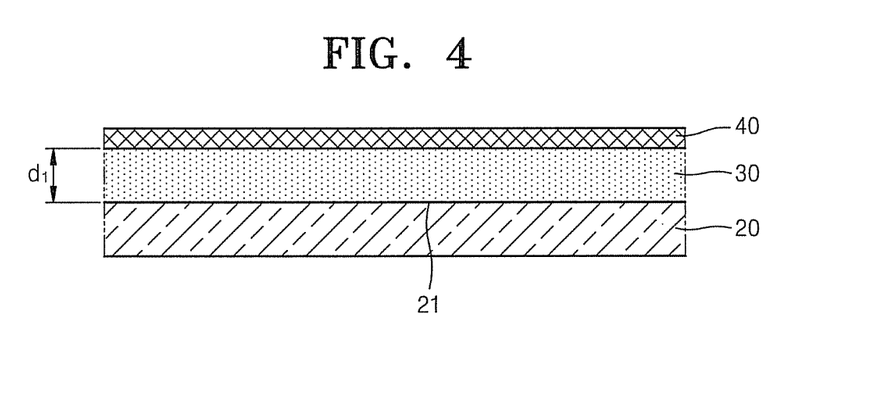
FIGS. 4 and 5 are cross-sectional views for explaining an operation of aspects of the present invention.
Figure 5:
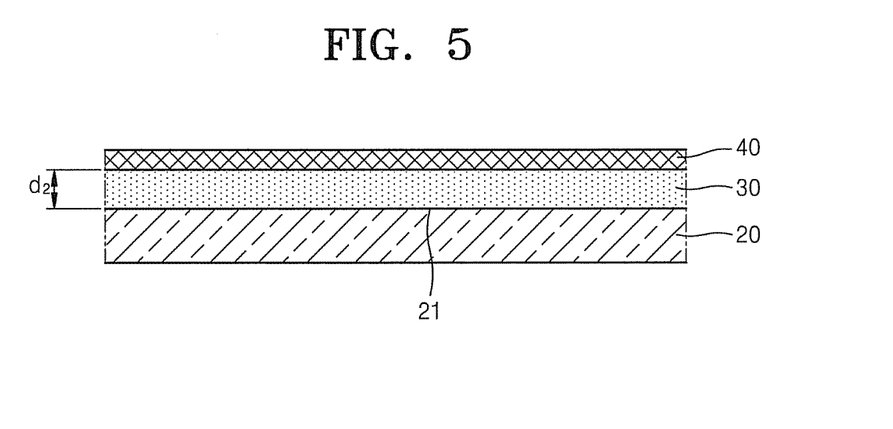

That is, as illustrated in FIGS. 1, 4 and 5, when a user presses an outer surface of the second substrate 12 of the organic light emitting display panel 10, a first thickness d1 of the cushion member 30 illustrated in FIG. 4 is reduced to a second thickness d2 illustrated in FIG. 5. Here, there is no doubt that the second thickness d2 is thinner than the first thickness d1.

According to equation 1 below, in a capacitor, a capacitance C is inversely proportional to a thickness d of a dielectric material, which is a distance between electrodes $$C = \in (A/d) \tag{1}$$

That is, if a capacitance when the cushion member 30 has the first thickness d1, as illustrated in FIG. 4, is a capacitance C1, and a capacitance when the cushion member 30 has the second thickness d2 that is thinner than the first thickness d1, as illustrated in FIG. 5, is a capacitance C2, the capacitance C2 is greater than the capacitance C1.

Accordingly, the sensor unit 50 stores the value of the capacitance C1 when the cushion member 30 has the first thickness d1 and then measures the value of the capacitance C2 when the thickness of the cushion member 30 becomes the second thickness d2. When the variation in the value becomes more than a standard value, the sensor unit 50 can determine whether the organic light emitting display panel 10 is touched or not by a user.

After the determination is performed by using a variation in the capacitance according to a variation in thickness of the cushion member 30, the location of the touch is determined using the photosensor 16 formed in the aforementioned light emitting unit 14.

Furthermore, according to an aspect of the present invention, a touch error which is a problem of touch functions using only a variation in capacitance when a user's finger touches the organic light emitting display panel 10 or using only a photosensor, that is, an error in which it is perceived that a user has touched the organic light emitting display panel 10 even though the user only approached the organic light emitting display panel 10 without touching it, can be overcome.

Figure 6:
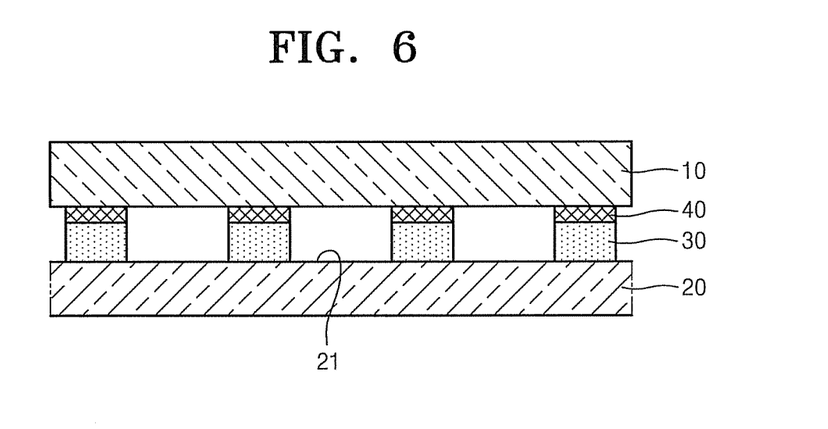
FIG. 6 is a cross-sectional view of a flat panel display device according to another exemplary embodiment of the present invention.

In the above embodiment, the conductive film 40 is not patterned and only a determination regarding a user's touch is performed, but aspects of the present invention are not limited thereto. As illustrated in FIG. 6, the conductive film 40 is patterned so as to determine the location of the touch. In this case, each of the patterned conductive films 40 is required to be connected to the sensor unit 50, and thus the sensor unit 50 may determine the location where a capacitance has varied.

The cushion member 30 may be patterned in the same way as the conductive film 40, so that the sensor unit 50 can more accurately determine the location where a capacitance has varied. In this case, there is a greater possibility that only the touched cushion member 30 is compressed compared to a possibility that the cushion member 30 is not patterned, thereby increasing accuracy in determining the location of the touch.

Figure 7:
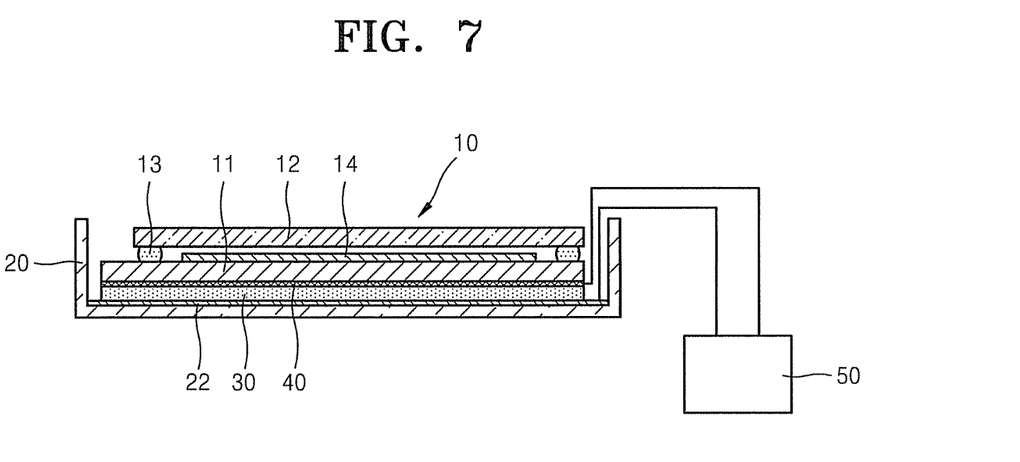
FIG. 7 is a cross-sectional view of a flat panel display device according to another exemplary embodiment of the present invention.

FIG. 7 is a cross-sectional view of a flat panel display device according to another exemplary embodiment of the present invention. In FIG. 7, the frame 20 is formed of an insulator. Here, an additional conductive film 22 is formed on an inner surface of the frame 20, so that the conductive film 22 and the conductive film 40 formed under the first substrate 11 form a capacitor. The conductive film 22 is electrically connected to the sensor unit 50. The conductive film 22 may be formed by various methods, such as plating, coating, gluing, or the like.

In the current embodiment, since the frame 20 has an insulating property, even when other electronic devices are installed in an outer side of the frame 20, the frame 20 does not affect the electronic devices electrically.

Figure 8:
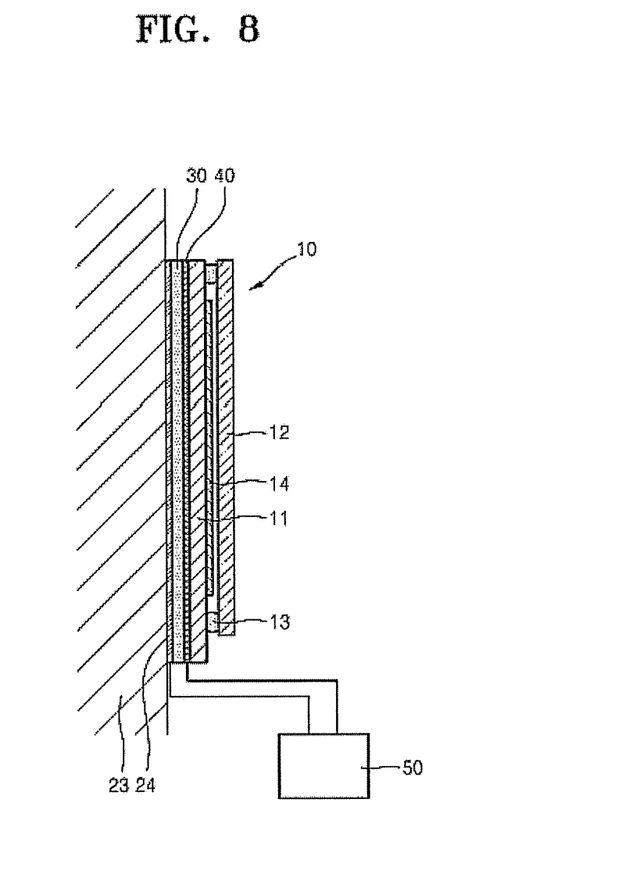
FIG. 8 is a cross-sectional view of a flat panel display device according to another exemplary embodiment of the present invention.

FIG. 8 is a cross-sectional view of a flat panel display device according to another exemplary embodiment of the present invention. In FIG. 8, the organic light emitting display panel 10 is installed in another facility 23 instead of being installed in the frame 20 as in the above embodiment. Here, the facility 23 may be a building, furniture, apparatus, or the like. The organic light emitting display panel 10 can be used by being directly installed in a desired location due to its flexibility.

When the organic light emitting display panel 10 is installed in the facility 23, an additional conductive film 24 is formed on a surface of the facility 23 facing the organic light emitting display panel 10. The conductive film 24 may be formed by various methods such as plating, coating, gluing, or the like, and may also be formed by painting with paints.

Similarly to the above-mentioned embodiments, the cushion member 30, the conductive film 40, and the organic light emitting display panel 10 are formed on the conductive film 24, so that the conductive film 24 installed in the facility 23 and the conductive film 40 formed under the organic light emitting display panel 10 form a capacitor by the medium of the cushion member 30. Each of the conductive films 24 and 40 is electrically connected to the sensor unit 50.

As such, aspects of the present invention can be applied in various ways.

Aspects of the present invention are not limited to an OLED, and may also be applied to various flat panel display devices, such as a liquid crystal display device, an inorganic electroluminescence display device, or the like.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A flat panel display device comprising:
 a first face;
 a frame comprising a conductive face and a portion that is substantially perpendicular to the conductive face, the frame supporting the first face;
 a cushion member interposed between the first face and the conductive face and formed of a dielectric material, wherein a thickness of the cushion member varies depending on an externally applied pressure;
 a conductive film interposed between the first face and the cushion member; and
 a sensor unit electrically connected to the conductive face and the conductive film respectively, which calculates and senses a variation in capacitance of a capacitor comprising the conductive face, the cushion member, and the conductive film,
 wherein the cushion member is configured to contact the conductive face and the conductive film when the thickness of the cushion member is at a maximum, and
 wherein the cushion member is spaced from the portion of the frame that is substantially perpendicular to the conductive face.

2. The flat panel display device of claim 1, wherein the conductive face is formed of a metal, and the conductive face and the frame are integrally formed.

3. The flat panel display device of claim 1, wherein the frame is formed of an insulator.

4. The flat panel display device of claim 1, wherein the conductive film is patterned.

5. The flat panel display device of claim 4, wherein the cushion member is patterned.

6. The flat panel display device of claim 5, wherein the same pattern is used to pattern the cushion member and the conductive film.

7. The flat panel display device of claim 1, wherein the flat panel display device displays an image through a second face disposed opposite to the first face.

8. The flat panel display device of claim 1, wherein the cushion member further comprises an adhesive layer.

9. A flat panel display device comprising:
 a pair of conductive faces which are opposite to each other;
 a cushion member interposed between the conductive faces and formed of a dielectric material, wherein a thickness of the cushion member varies depending on an externally applied pressure, and wherein the cushion member is configured to contact both of the conductive faces when the thickness of the cushion member is at a maximum;
 a display device located on an outer side of one conductive face of the conductive faces;
 a sensor unit electrically connected to each of the conductive faces, which calculates and senses a variation in capacitance of a capacitor comprising the conductive faces and the cushion member; and
 a frame comprising a first portion for supporting the pair of conductive faces, the cushion member, and the display device, and a second portion that is substantially perpendicular to the first portion,
 wherein the cushion member is spaced from the second portion of the frame.

10. The flat panel display device of claim 9, wherein one of the conductive faces is patterned.

11. The flat panel display device of claim 10, wherein the cushion member is patterned.

12. The flat panel display device of claim 11, wherein the same pattern is used to pattern the cushion member and the conductive face.

13. The flat panel display device of claim 9, wherein the cushion member further comprises an adhesive layer.

* * * * *

UNITED STATES PATENT AND TRADEMARK OFFICE
CERTIFICATE OF CORRECTION

| | | |
|---|---|---|
| PATENT NO. | : 8,723,813 B2 | Page 1 of 1 |
| APPLICATION NO. | : 12/494502 | |
| DATED | : May 13, 2014 | |
| INVENTOR(S) | : Park et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 969 days.

Signed and Sealed this
Eleventh Day of August, 2015

Michelle K. Lee
*Director of the United States Patent and Trademark Office*